(12) United States Patent
Hyer et al.

(10) Patent No.: US 9,279,066 B1
(45) Date of Patent: Mar. 8, 2016

(54) SLURRY FOR ASPHALT PAVEMENT AND DRIVEWAY SEALER

(71) Applicant: Gardner-Gibson, Inc., Tampa, FL (US)

(72) Inventors: Raymond Hyer, Tampa, FL (US); Ionela Glover, Lithia, FL (US); Michael Yap, Spring Hill, FL (US); Amir Khan, Valrico, FL (US)

(73) Assignee: Gardner-Gibson, Inc., Tampa, FL (US)

( * ) Notice: Subject to any disclaimer, the term of this patent is extended or adjusted under 35 U.S.C. 154(b) by 57 days.

(21) Appl. No.: 14/103,320

(22) Filed: Dec. 11, 2013

(51) Int. Cl.
*C09D 195/00* (2006.01)
*C09D 101/00* (2006.01)
*C08L 95/00* (2006.01)

(52) U.S. Cl.
CPC ............. *C09D 195/005* (2013.01); *C08L 95/00* (2013.01); *C09D 101/00* (2013.01)

(58) Field of Classification Search
CPC ... C08L 95/00; C09D 101/00; C09D 195/005
USPC ................................ 524/60; 106/281.1, 273.1
See application file for complete search history.

(56) References Cited

U.S. PATENT DOCUMENTS

2007/0169668 A1* 7/2007 Moss ...................... C08L 95/00
106/281.1

* cited by examiner

*Primary Examiner* — Michael M Bernshteyn
(74) *Attorney, Agent, or Firm* — Traverse Legal, PLC

(57) ABSTRACT

What is provided are compositions of matter and methods for making the compositions of matter, which comprise a limestone and clay slurry for pavement and driveway sealer products. The pavement sealer composition comprises a limestone and clay slurry and an asphalt emulsion. The limestone slurry comprises wet limestone, bentonite and kaolin clay. The asphalt emulsion comprises an asphalt emulsion blend made from an asphalt emulsion concentrate.

24 Claims, No Drawings

SLURRY FOR ASPHALT PAVEMENT AND DRIVEWAY SEALER

FIELD

This patent application relates to asphalt pavement and driveway sealers.

BACKGROUND

A driveway or pavement sealer product is usually a water based asphalt product that is applied in a liquid form over an existing road surface as a coating. As a water based product, it requires temperatures above 65 F to cure properly. If temperatures fall below 65 F, curing time may increase and/or curing may not be complete. In order to expand the possible application conditions given environmental conditions during application, there is a desire to make a water-based pavement sealer product having decreased drying/curing time and/or able to cure at lower temperatures.

Known driveway sealers have been made using aqueous drilling fluid. Drilling fluid has typically consisted of bentonite clay, with an acrylic polymer as a thickener. Drilling fluid slurry products have been available with a clay, such as a bentonite using a polymer, already incorporated in the slurry, to control viscosity in making driveway sealer products. However, water-based pavement sealer products have been known to exhibit low wear resistance properties. As such, there is a desire to make a water-based pavement sealer having increased wear resistance.

One idea for increasing wear resistance properties is to add an aggregate, such as sand or limestone, to result in a product having a harder surface.

Aside from driveway/pavement sealer asphalt products, the use of limestone or treated limestone added as a slurry, and then added to asphalt or asphalt emulsion, has been known for cold paving applications. For example, an asphalt emulsion pavement product is known, having asphalt and clay that includes limestone as a filler that may be post-added as a dry powder to the emulsion. For example, an aqueous cold paving formulation including powder lime and aggregate that is wetted (mixed with water), with an asphalt emulsion then added to the aqueous mixture, is known. According to one such cold paving formulation using asphalt emulsion, aggregates may be mixed with Portland cement or lime, water and then added to an asphalt emulsion. Alkali metal salts, metal hydroxides, ammonium salts and ammonium hydroxide are used to control breaking of the emulsion. However, this cold paving application is a micro-paving product and not a coating product.

Accordingly, there exists a need in the art for an asphalt driveway/pavement sealer product and method of making it, which provides a water-based product having increased wear resistance and shorter drying time at low temperatures that has a desired deeper black color.

SUMMARY

What is provided are compositions of matter and methods for making the compositions of matter, which comprise an improved slurry for pavement and driveway sealer products, including a wet limestone. The improved composition includes a new and different kind of clay from prior known compositions, kaolin clay, which complements the other clays. The composition includes kaolin clay that may be combined with an alcomer polymer (poly acrylamide), which helps control the viscosity of the slurry, as well as sodium bentonite clay, which further helps to control the viscosity, and an anti microbial. The composition comprises a limestone slurry, as opposed to the typical limestone product having dry limestone added or post-added dry to the asphalt emulsion before it is added to the slurry. Instead, in the present compositions, the limestone is added to the slurry, not the asphalt emulsion. The limestone slurry is a suspension of materials in water, which is then added with an asphalt emulsion to make the sealer product. The aqueous limestone slurry results in a product that is blacker in color due to the dispersion of the limestone in the slurry before being adding to the asphalt emulsion, and which dries faster at lower temperatures, has increased wear resistance, better viscosity control, improved weathering properties and a harder surface. Different products (grades) are possible by varying the solids composition vs. water composition.

DETAILED DESCRIPTION

In the following detailed description, numerous specific details are set forth in order to provide a thorough understanding of the examples as defined in the claimed subject matter, and as an example of how to make and use the improved slurry. However, it will be understood by those skilled in the art that claimed subject matter is not intended to be limited to such specific details, and may even be practiced without requiring such specific details. In other instances, well-known methods, procedures, and components have not been described in detail so as not to obscure the improved slurry and methods of making the improved slurry, defined by the claimed subject matter.

What is provided are compositions of matter that are improved limestone slurry based asphalt driveway/pavement sealer products, and methods of making the products. According to one or more examples, the limestone slurry is comprised of water, limestone, kaolin and bentonite clays and an anti microbial. The clays serve as a stabilizer and viscosity enhancer and stabilizer for the composition. Kaolin clay acts to further modify the rheological properties of the slurry and the sealer. Anti-microbials may be used with any materials that incorporate water to keep molds, fungi and algae from growing in the water medium during manufacture and storage.

According to one or more examples, the asphalt emulsion blend is comprised of an asphalt emulsion concentrate that is manufactured from asphalt, clay, water, surfactant, acid to adjust pH, and an anti-microbial. The composition is combined with more water, color, sand, another antimicrobial and one or more asphalt components.

According to one example method, the materials may be combined in two steps. First, the limestone, kaolin clay and bentonite clays, water and anti-microbial may be combined into a slurry. Second, the slurry may be blended with an asphalt emulsion blend.

According to other example methods, the improved sealer product may be manufactured in a multi-step process from a number of materials and intermediates. In various examples, the materials may be combined in a number of steps. The process used to manufacture the improved sealer may include manufacturing one or more of a number of intermediates, which are made separately and then combined into other intermediates, which are then combined to form the pavement sealer. For example, an intermediary asphalt emulsion and/or asphalt emulsion concentrate may be made to include asphalt, clay, water, surfactant, acid, and an anti-microbial. This intermediary may be then combined with water, color, sand, an anti-microbial and one or more asphalt components, into the asphalt emulsion blend. The lime slurry may then be combined with the asphalt emulsion blend.

According to an example, the limestone slurry may comprise:

| Slurry | % by Weight | Range | |
|---|---|---|---|
| Water | 64.35 | 55 | 75 |
| Anti-Microbial | 0.35 | 0 | 1 |
| Kaolin Clay | 3.65 | 1 | 5 |
| Limestone | 26.77 | 20 | 40 |
| Bentonite Clay | 4.87 | 2 | 8 |
| Polyacrylate Sodium Salt Viscosity Modifier | 0.01 | 0 | 0.1 |

The composition comprises a limestone slurry, as opposed to the typical slurry without limestone (where, if used at all, a dry limestone product may be post-added dry to the asphalt emulsion and not to the slurry). Rather than being dry limestone, the limestone slurry is a aqueous product—a suspension of materials in water. The kaolin and/or bentonite clays may act as rheological stabilizers in the slurry. The kaolin clay is combined with an alcomer polymer (poly acrylamide and/or polyacrylate sodium salt), which helps clay to modify the viscosity of the solution to thicken the slurry.

In asphalt emulsions, to prevent microbial growth, an anti-microbial may also be included, such as but not limited to, Mergal or similar (Proxel, Myacide. Canguard, or Dowicil). This may also be used in high water content asphalt cements. Anti-microbial agents may be used to reduce and/or prevent the growth of micro-organisms such as bacterial, algae, fungi and others from growing in the water medium of an emulsion.

One example of an asphalt emulsion composition with which the limestone slurry may be combined to form the sealer product may comprise:

| Asphalt Emulsion Concentrate | % by Weight | Range | |
|---|---|---|---|
| Bentonite Slurry | 50.35 | 40 | 55 |
| Chromic Acid | 0.22 | 0 | 1 |
| Asphalt | 39.71 | 35 | 50 |
| Water | 9.61 | 5 | 15 |
| Mergal 165 | 0.11 | 0 | 1 |

Bentonite and/or spinks clay slurry may serve as an emulsion rheological stabilizer. The use of emulsifiers and emulsion stabilizers is to emulsify and stabilize the composition of matter. Bentonite and/or spinks clays may also serve as thixotropic agents/modifiers to adjust the viscosity of the asphalt emulsion concentrate. Acid may also be included to adjust the ph of the composition. For example, chromic acid may be included in various examples. Anti-microbial agents, such as Mergal 165, may be used to reduce and/or prevent the growth of micro-organisms such as bacterial, algae, fungi and others from growing in the water medium of an emulsion.

The asphalt emulsion concentration may be used to form an asphalt emulsion blend. One example of an asphalt emulsion blend, in accordance with the present application is:

| Asphalt Emulsion Blend | 1 | 2 | 3 | Range | |
|---|---|---|---|---|---|
| Water | 43.55 | 18.26 | 13.49 | 10 | 45 |
| Asphalt Emulsion Concentrate | 39.45 | 56.45 | 58.80 | 35 | 60 |
| Asphalt Surfactant | 0.34 | 0.45 | 0.57 | 0 | 1 |
| Sand | 15.92 | 22.11 | 23.83 | 10 | 30 |
| Midnight Black | 0.32 | 2.26 | 2.83 | 0 | 5 |
| Anti Microbial | 0.42 | 0.47 | 0.48 | 0 | 1 |

In addition to water and the asphalt emulsion concentrate, one or more asphalt emulsion blend examples may include an asphalt surfactant, which is a solvent capable of dissolving the asphalt emulsion blend into a liquid at room temperatures. An example asphalt surfactant may include, but is not limited to, analiphatic oil. One or more examples of the asphalt emulsion blend composition may include one or more filler materials, such as but not limited to, sand. Sand may be used as a traction modifier for driveway sealer applications of the composition. One or more pavement sealer examples may also include a colorant, such as Midnight black and/or carbon black, to impart a deep black color to the product.

The asphalt emulsion blend may be made in various concentrations, such as but not limited to, the 1, 2 and 3 formulations described. There exist other grades of asphalt emulsion blends between 1 and 3, in addition to those described. Various concentrations may have varying relative amounts of solid materials and/or water. Various concentrations may have varying relative amounts of asphalt emulsion concentrate and water. Various examples may have varied amounts of sand (filler material), surfactant, color and/or anti-microbial components, based upon the relative concentration amounts of the solid materials and water.

The asphalt emulsion blends may be combined with the limestone slurry to create driveway sealer/pavement products. Example formulations include:

| Driveway/Pavement Sealer | 1 | 2 | 3 | Range | |
|---|---|---|---|---|---|
| Asphalt Emulsion | 68.54 | 62.00 | 61.09 | 55 | 75 |
| Limestone Slurry | 31.46 | 38.00 | 37.91 | 28 | 50 |
| Polymer | 0 | 0 | 1.00 | 0 | 5 |

The driveway/pavement sealer composition may be made in various concentrations, such as but not limited to, the 1, 2 and 3 formulations described. There exist other grades of driveway/pavement sealer compositions between 1 and 3, in addition to those described. Various concentrations may have varying relative amounts of solid materials and/or water. The 3 example includes a polymer to enhance performance.

The wet limestone slurry may control the viscosity of the driveway/pavement sealer composition and the viscosity stability of the sealer product. The limestone slurry may improve the sealer product's resistance to wear.

Internal testing results using scrub testing methods (the number of cycles of a weighted brush passing over a test specimen covered with water until failure), have produced improved results over prior known sealer products. This internal testing was conducted on specimens that had been dried at 4° C. overnight and other specimens that had been thoroughly dried. The specimens dried at low temperature gave an indication of the speed with which the sealer dries along with its susceptibility to water. The wetted limestone slurry dries faster at lower temperatures, than previous known sealer products. For instance, the low temperature scrub resistance is up to ten times better than standard pavement sealer dried at low temperatures.

The slurry also allows the incorporation of limestone into the formula in a unique way. In other processes, limestone is added as a solid to the sealer. By adding it as a water slurry, the current example results in a product where the limestone does not change and/or does not substantially change viscosity of the sealer product (and other properties) over time, as the limestone is already wetted. In contrast, when added as a solid, the limestone is wetted over a period of time resulting in the drifting properties as the limestone wets with water. Thus, it has increased wear resistance, better viscosity control, improved weathering properties and a harder surface.

The wetted limestone also results in a product that is a more intense and/or deeper blacker in color due to the dispersion of the limestone in the slurry before adding to the asphalt emulsion.

Throughout this specification, the term process may, depending at least in part upon the particular context, be understood to include any method, process, apparatus, and/or other patentable subject matter that implements the subject matter disclosed herein.

It will, of course, be understood that, although particular examples have just been described, the claimed subject matter is not limited in scope to a particular examples or implementation. For example, one example may be in a composition of matter, and another may be a process for making a composition of matter, such as implemented to operate on a device or combination of devices, for example, whereas another examples may be in a product made by a particular process and another examples may be in a product that is a composition of matter that may be made by multiple various methods and/or apparatuses. Likewise, an examples may be implemented any combination of compositions of matter, apparatuses, methods or products made by a process.

In the preceding description, various aspects of claimed subject matter have been described. For purposes of explanation, specific numbers, percentages, components, ingredients and/or configurations were set forth to provide a thorough understanding of claimed subject matter. However, it should be apparent to one skilled in the art having the benefit of this disclosure that claimed subject matter may be practiced without the specific details. In other instances, features that would be understood by one of ordinary skill were omitted or simplified so as not to obscure claimed subject matter. While certain features and examples have been illustrated or described herein, many modifications, substitutions, changes or equivalents will now occur to those skilled in the art. It is, therefore, to be understood that the appended claims are intended to cover all such modifications or changes as fall within the true spirit of claimed subject matter.

The invention claimed is:

1. A pavement sealer composition of matter comprising:
   a limestone and clay slurry, said limestone and clay slurry being a water based slurry; and
   an asphalt emulsion concentrate.

2. The composition of claim 1, said limestone and clay slurry comprising wet limestone that is combined with said asphalt emulsion in a liquid form.

3. The composition of claim 2, said limestone and clay slurry further comprising kaolin clay.

4. The composition of claim 1, said limestone and clay slurry comprising: water, limestone, kaolin clay, bentonite clay and an anti microbial.

5. The composition of claim 4, further comprising a viscosity modifier.

6. The composition of claim 4, said limestone and clay slurry comprising from 20 to 40% by weight limestone.

7. The composition of claim 4, said limestone and clay slurry comprising from 1 to 5% by weight kaolin clay.

8. The composition of claim 1, the limestone and day slurry is not dried into a dry powder form prior to being combined with the asphalt emulsion.

9. The composition of claim 1, further comprising an asphalt emulsion blend, the asphalt emulsion blend comprising the asphalt emulsion concentrate, water, color, sand, an antimicrobial and an asphalt surfactant.

10. The composition of claim 9, the asphalt emulsion blend comprising from 35-60% by weight of the asphalt concentrate.

11. The composition of claim 1, the asphalt emulsion concentrate comprising: asphalt, a clay slurry, water, a surfactant, an acid, and an anti-microbial.

12. The composition of claim 1, the limestone and day slurry comprising from 28 to 50% by weight of the composition.

13. The composition of claim 1, the asphalt emulsion comprising from 55 to 75% by weight of the composition.

14. The composition of claim 1 further comprising a polymer in the range of from 0.1 to 5% by weight of the composition.

15. The composition of claim 4, the limestone and day slurry comprising: from 20 to 40% by weight limestone and from 1 to 5% by weight of kaolin day.

16. The composition of claim 5, the limestone and day slurry comprising about 26% by weight limestone, about 3% by weight of kaolin day, about 64% by weight water, about 4% by weight of bentonite day, about 0.3% by weight antimicrobial and about 0.01% by weight of a viscosity modifier.

17. The composition of claim 9, the limestone and day slurry in an amount of about 31% by weight of the composition and the asphalt emulsion blend in an amount of about 68% by weight of the composition.

18. The composition of claim 9, the limestone and day slurry in an amount of about 38% by weight of the composition and the asphalt emulsion blend in an amount of about 62% by weight of the composition.

19. The composition of claim 9, the limestone and clay slurry in an amount of about 37% by weight of the composition and the asphalt emulsion blend in an amount of about 61% by weight of the composition.

20. The composition of claim 11, the asphalt emulsion concentrate comprising from 35 to 50% by weight asphalt.

21. The composition of claim 11, the asphalt emulsion concentrate comprising: about 39% by weight asphalt; about 50% by weight bentonite slurry; about 9% by weight water; about 0.2% by weight chromic acid; and about 0.1% by weight anti-microbial.

22. The composition of claim 9, the asphalt emulsion blend comprising: about 39% by weight of asphalt concentrate, about 43% by weight water, about 15% by weight sand, about 0.3% by weight surfactant, about 0.3% by weight color, and about 0.4% by weight anti-microbial.

23. The composition of claim 9, the asphalt emulsion blend comprising: about 56% by weight of asphalt concentrate, about 18% by weight water, about 22% by weight sand, about 0.4% by weight surfactant, about 2.2% by weight color, and about 0.4% by weight anti-microbial.

24. The composition of claim 9, the asphalt emulsion blend comprising: about 58% by weight of asphalt concentrate, about 13% by weight water, about 22% by weight sand, about 0.5% by weight surfactant, about 2.8% by weight color, and about 0.4% by weight anti-microbial.

* * * * *